E. W. SEEGER.
CONTROLLER FOR SYNCHRONOUS MOTORS.
APPLICATION FILED FEB. 12, 1921.

1,414,791.

Patented May 2, 1922.

Inventor
Edwin W. Seeger
By
Attorney

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR SYNCHRONOUS MOTORS.

1,414,791.    Specification of Letters Patent.    Patented May 2, 1922.

Application filed February 12, 1921. Serial No. 444,399.

*To all whom it may concern:*

Be it known that I, EDWIN W. SEEGER, a citizen of the United States, residing at Milwaukee, in the county of Milwaukee and State of Wisconsin, have invented new and useful Improvements in Controllers for Synchronous Motors, of which the following is a full, clear, concise, and exact description, reference being had to the accompanying drawing, forming a part of this specification.

This invention relates to controllers for synchronous motors.

An object of the invention is to provide a controller of the aforesaid character which is adapted to automatically establish plugging connections for the motor upon interruption of the running connections therefor.

Another object is to provide a controller of the aforesaid character having means responsive to certain electrical conditions in the field circuit of the motor for automatically interrupting the plugging connections for the motor when the same approaches a condition of rest.

Various other objects and advantages of the invention will hereinafter appear.

The accompanying drawing illustrates certain embodiments of the invention which will now be described, it being understood that the embodiments illustrated are susceptible of various modifications without departing from the scope of the appended claims.

Figures 1, 2, 3:
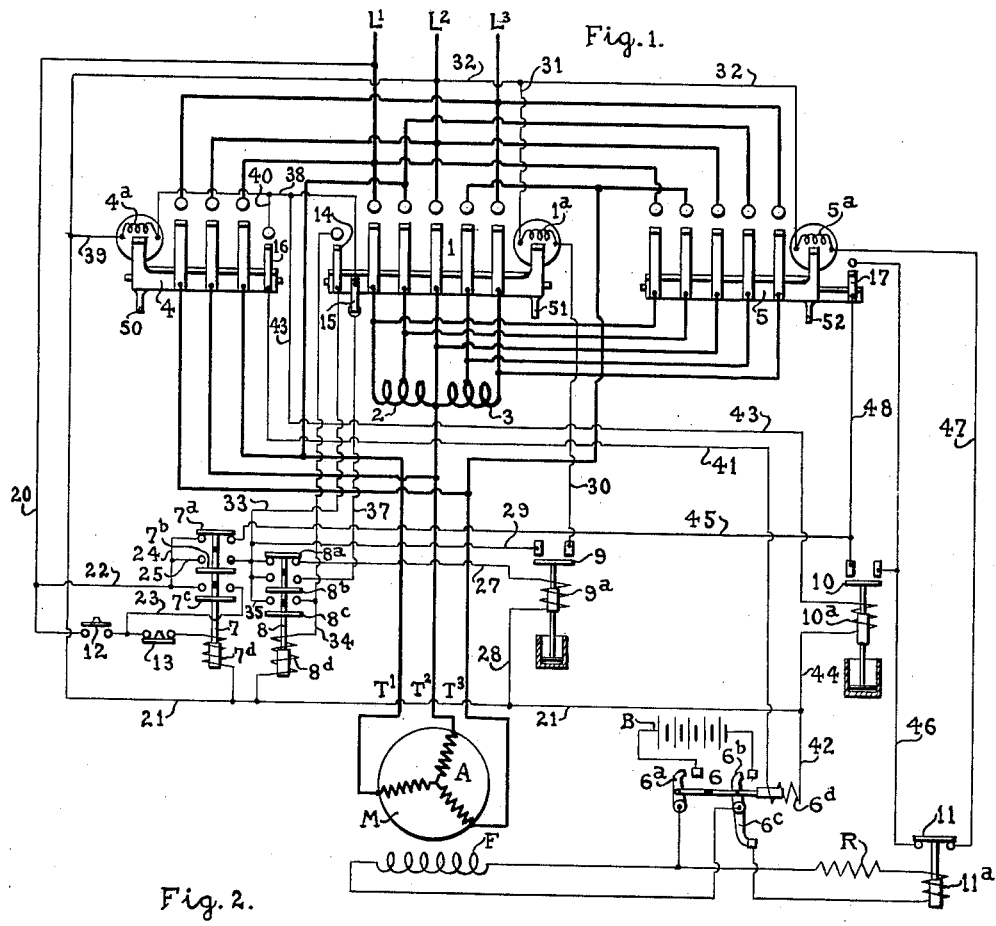
Fig. 1 is a diagrammatic view of the controller embodying the invention.
Fig. 2 is a plan view of a mechanical interlock for certain of the switches shown in Fig. 1.
Fig. 3 is a diagrammatic view illustrating a modification of the controller shown in Fig. 1.

Referring to Fig. 1, the same illustrates a three phase synchronous motor M having a stator "A" to be supplied with current from a three phase A. C. circuit illustrated by lines L', L² and L³ and a field "F" to be excited from a D. C. source illustrated by a battery "B."

The controller includes a five pole electromagnetic switch 1 for establishing starting connections through compensator windings 2 and 3, a three pole electro-magnetic switch 4 for establishing running connections and a five pole electro-magnetic switch 5 for establishing plugging connections through said windings. The controller also includes an electromagnetic field control switch 6 having normally open switch arms 6ª and 6ᵇ for including battery "B" in the field circuit of the motor and a normally closed switch arm 6ᶜ for including a discharge resistance "R" in said field circuit.

The control means for the aforementioned switches includes electro-magnetic relays 7 and 8, electro-magnetic dash pot relays 9 and 10 and a frequency responsive relay 11. Relay 7 is controlled by a normally open start switch 12 and a normally closed stop switch 13 and is provided with a normally closed contact 7ª and normally open contacts 7ᵇ and 7ᶜ. Relay 8 is controlled by contact 7ᵇ and a normally open auxiliary switch 14 associated with starting switch 1 and is provided with a normally closed contact 8ª and normally open contacts 8ᵇ and 8ᶜ. Starting switch 1 is controlled by relay 9 and contact 7ᵇ and the energizing circuit of said relay is controlled by contacts 7ᵇ and 8ª. Running switch 4 is controlled by contacts 7ᵇ, 8ᵇ and a normally closed auxiliary contact 15 associated with starting switch 1 while field switch 6 is controlled by said contacts and said auxiliary switch and a normally open auxiliary contact 16 associated with running switch 4. Plugging switch 5 is controlled by contact 7ª, relays 10 and 11 and a normally open auxiliary switch 17 associated with said plugging switch. The energizing circuit of relay 10 is controlled by contacts 7ᵇ, 8ᵇ and auxiliary switch 15 while relay 11 is arranged to be connected in the field circuit of motor M by switch arm 6ᶜ.

The operation and circuit connections of the aforedescribed controller will now be more fully set forth. Closure of start switch 12 establishes an energizing circuit for relay 7 extending from line L' by conductor 20 through switches 12 and 13 through winding 7ᵈ of relay 7 and by conductor 21 to line L². Relay 7 thereupon responds and establishes a maintaining circuit for itself extending from line L' by conductors 20 and 22 through contact 7ᶜ by conductor 23 through switch 13 and thence through winding 7ᵈ to line L² as already traced. In responding switch 7 establishes an energizing circuit for relay 9 extending from line L' by conductors 20, 22, 24 and 25 through contacts 7$^b$ and 8$^a$ of relays 7 and 8 by conductor 27 through winding 9$^a$ of relay 9 and by conductors 28 and 21 to line L$^2$. In responding relay 9 establishes an energizing circuit for starting switch 1 extending from line L′ through contact 7$^b$ of relay 7 as already traced by conductor 29 through relay 9 by conductor 30 through winding 1$^a$ of said starting switch and by conductors 31 and 32 to line L$^2$. In responding switch 1 establishes low voltage power connections for stator A, the compensator windings 2 and 3 being then connected between lines L′—L$^2$ and L$^2$—L$^3$ respectively, while the terminals T$^1$ and T$^3$ of stator A are connected to intermediate taps on compensator windings 2 and 3 respectively and terminal T$^2$ of said stator is connected to line L$^2$. The motor M then starts up as an induction motor, the field circuit thereof being connected in a closed loop through discharge resistance "R" by switch arm 6$^c$ of field switch 6. Closure of switch 1 closes auxiliary switch 14 and an energizing circuit for relay 8 is then established extending from line L′ to and through contact 7$^b$ of relay 7 as already traced by conductor 33 through auxiliary switch 14 by conductor 34 through winding 8$^d$ of relay 8 and by conductor 21 to line L$^2$. In responding relay 8 opens its contact 8$^a$ to interrupt the energizing circuit of relay 9 and in responding the same maintains itself by a circuit extending from line L′ through contact 7$^b$ of relay 7 as already traced by conductor 35 through contact 8$^c$ by conductor 34 through winding 8$^d$ to line L$^2$ as already traced. Upon interruption of the energizing circuit of relay 9 the same opens subject to retardation by its dash pot and interrupts the energizing circuit of starting switch 1. Upon opening of starting switch 1 auxiliary switch 15 closes to establish an energizing circuit for running switch 4 extending from line L′ through contact 7$^b$ as already traced through contact 8$^b$ by conductor 37 through auxiliary switch 15 by conductor 38 through winding 4$^a$ of running switch 4 and by conductors 39 and 21 to line L$^2$. Running switch 4 thereupon responds to connect terminals T$^1$, T$^2$ and T$^3$ of stator A to lines L′, L$^2$ and L$^3$ respectively. Upon response of said running switch auxiliary contact 16 establishes an energizing circuit for field switch 6 extending from line L′ through contacts 7$^b$, 8$^b$ and auxiliary switch 15 to conductor 38 as already traced by conductor 40 through auxiliary switch 16 by conductor 41 through winding 6$^d$ of field switch 6 and by conductors 42 and 21 to line L$^2$. Upon response of switch 6, the switch arms 6$^a$ and 6$^b$ thereof connect the field "F" of motor "M" across the terminals of battery "B."

Upon establishment of the energizing circuit for running switch 4, relay 10 is energized by a circuit extending from line L′ through contacts 7$^b$, 8$^b$ and auxiliary switch 15 to conductor 38 as already traced by conductor 43 through winding 10$^a$ of relay 10 and by conductors 44 and 21 to line L$^2$. Relay 10 remains closed subject to de-energization thereof by relay 7 and assuming now that it is desired to stop the motor stop switch 13 is opened to interrupt the maintaining circuit of relay 7. Relay 7 then drops out and the contact 7$^b$ thereof interrupts the energizing circuits of running switch 4, field switch 6 and relays 8 and 10. Relay 10 is retarded in opening by its dash pot and prior to opening thereof contact 7$^a$ of relay 7 closes to establish an energizing circuit for plugging switch 5 extending from line L′ by conductors 20, 22 and 24 through contact 7$^a$ by conductor 45 through relay 10 by conductor 46 through relay 11 by conductor 47 through winding 5$^a$ of said plugging switch and by conductor 32 to line L$^2$. Plugging switch 5 thereupon responds and establishes a maintaining circuit for itself extending from line L′ to conductor 45 as already traced by conductor 48 through auxiliary switch 17 by conductor 46 through relay 11 and conductor 47 through winding 5$^a$ to line L$^2$ as already traced. Closure of plugging switch 5 connects the stator "A" to lines L′, L$^2$ and L$^3$ through compensator windings 2 and 3 but reverses the phase relation of the current supplied to the motor. The compensator windings 2 and 3 are then connected between lines L′—L$^2$ and L$^2$—L$^3$ respectively while the outer terminals T$^1$ and T$^3$ of stator "A" are connected to the intermediate taps of windings 3 and 2 respectively and the middle terminal T$^3$ of said stator is connected to line L$^2$. Prior to closure of plugging switch 5 field switch 6 has returned to normal position and the switch arm 6$^c$ thereof, connects the field "F" of the motor "M" in a closed loop extending through resistance "R" and winding 11$^a$ of relay 11. As is well-known, immediately upon establishment of the plugging connections the frequency of the current in the field circuit of the motor will be approximately twice that in the supply circuit L′, L$^2$ and L$^3$, and as the speed of the motor decreases the frequency of the current in the field circuit will decrease proportionately. When the motor is brought to rest the frequency of the current in the field circuit thereof will be the same as that in the supply circuit and relay 11 is calibrated to respond at such frequency but to remain unresponsive at higher frequencies. Thus relay 11 will open the energizing circuit of plugging switch 5 when the motor M is brought substantially to rest and upon opening of said switch the auxiliary switch 17 opens to insure against re-energization of said plugging switch by said relay.

It is desirable to interlock the switches 1, 4 and 5 to insure against simultaneous closure thereof and for this purpose interlocking means such as shown in Fig. 2 can be employed. The switches 1, 4 and 5 are provided with downwardly extending tail pieces 50, 51 and 52 respectively and as shown in Fig. 2 an interlocking member 53 is arranged between tail pieces 50 and 51 while a similar interlocking member 54 is arranged between tail pieces 51 and 52. Members 53 and 54 are each provided with a locking bar 55 and each is pivoted to move in a plane at substantially right angles to the planes of movement of said tail pieces. Upon closure of any one of switches 1, 4 or 5 the tail piece thereof maintains the members 53 and 54 in positions wherein the bars 55 thereof lock the other of said switches in open position.

Referring to Fig. 3 the same illustrates a modification of the controller shown in Fig. 1. A normally open voltage relay 60 is substituted for the normally closed frequency responsive relay 11 shown in Fig. 1. The winding $60^a$ of said relay is connected across the terminals of an inductance coil 61 through a resistance $R^1$ and said coil is arranged for connection across the terminals of field "F" by arm $6^c$ of field switch 6. As before set forth upon establishment of plugging connections the frequency of the current in the field circuit of the motor will be approximately twice that in the supply circuit $L'$—$L^2$ and $L^3$ and as the speed of the motor decreases the frequency of the current in the field circuit will decrease proportionately. With the inductance coil 61 connected in the field circuit of the motor the voltage in said circuit will vary in the same ratio as the frequency. Due to the high ohmic resistance and relatively low inductance of the circuit through winding $60^a$ relay 60 will respond to voltage variations but will be practically independent of the frequency. Relay 60 and the resistance $R^1$ are calibrated whereby said relay responds at a voltage corresponding to substantially a double frequency and to drop out at a voltage corresponding to a frequency which is the same as that in the supply circuit $L'$, $L^2$ and $L^3$. Thus the voltage relay 60 performs the same function as the frequency relay 11 in Fig. 1.

What I claim as new and desire to secure by Letters Patent is:

1. The combination with a synchronous motor of control means therefor for selectively establishing power connections of a given phase relation for running and of a reversed phase relation for plugging and means associated with said former means whereby the same interrupts said plugging connections under given electrical conditions in the field circuit of said motor.

2. The combination with a synchronous motor of control means therefor for selectively establishing power connections of a given phase relation for running and of a reversed phase relation for plugging and means associated with said former means necessitating establishment of said running connections prior to establishment of said plugging connections and insuring interruption of said plugging connections under predetermined electrical conditions in the field circuit of said motor.

3. The combination with a synchronous motor of means for establishing starting and running connections for said motor and means subjected to control by certain electrical conditions in the field circuit of the motor for establishing plugging connections for said motor upon interruption of the running connections therefor.

4. The combination with a synchronous motor of electro-responsive starting and running switches therefor, an electro-responsive plugging switch for said motor, selective control means for said switches insuring closure of said plugging switch upon opening of said running switch and means subjected to control by certain electrical conditions in the field circuit of said motor to insure opening of said plugging switch when the motor is brought substantially to rest.

5. The combination with a synchronous motor of electro-responsive starting and running switches therefor, an electro-responsive plugging switch for said motor, selective control means for said switches insuring closure of said plugging switch upon opening of said running switch, said means including a relay responsive to certain electrical conditions in the field circuit of said motor for insuring opening of said plugging switch when the motor is brought substantially to rest.

6. The combination with a synchronous motor of stator control means therefor including electro-responsive switches for selectively establishing power connections of a given phase relation for running and of a reversed phase relation for plugging, field control means for said motor and selective control means for said switches insuring closure of said plugging switch upon opening of said running switch, said control means including a relay to be included in the field circuit of said motor by said field control means to insure opening of said plugging switch when the motor is brought substantially to rest.

In witness whereof, I have hereunto subscribed my name.

EDWIN W. SEEGER.